United States Patent
Koeger et al.

(10) Patent No.: US 7,040,345 B2
(45) Date of Patent: May 9, 2006

(54) UNIDIRECTIONAL VALVES AND METHODS OF THEIR USE

(75) Inventors: Samuel Koeger, Zikhron Yaaqov (IL); Albrecht Fuchs, Zikhron Yaaqov (IL)

(73) Assignee: Beth-El Zikhron-Ya'Aqov Industries, LTD, Zikhron Yaaqov (IL)

( * ) Notice: Subject to any disclaimer, the term of this patent is extended or adjusted under 35 U.S.C. 154(b) by 343 days.

(21) Appl. No.: 10/622,424

(22) Filed: Jul. 21, 2003

(65) Prior Publication Data

US 2004/0149337 A1    Aug. 5, 2004

(30) Foreign Application Priority Data

Aug. 28, 2002    (IL) .................................. 151505

(51) Int. Cl.
*F16K 15/16*    (2006.01)
*F24F 13/08*    (2006.01)

(52) U.S. Cl. .............................. 137/512.15; 137/15.17; 454/358

(58) Field of Classification Search .......... 137/512.15, 137/15.17, 315.33; 454/358; 123/65 V, 123/73 A, 73 V See application file for complete search history.

(56) References Cited

U.S. PATENT DOCUMENTS

| 2,782,777 A | * | 2/1957 | Jasper .................... 137/512.15 |
| 4,567,816 A | * | 2/1986 | Kolt .......................... 454/358 |
| 4,691,623 A | * | 9/1987 | Mizusawa .............. 137/512.15 |
| 5,105,849 A | * | 4/1992 | Clough .................. 137/512.15 |
| 6,273,127 B1 | * | 8/2001 | Wade .................... 137/512.15 |

FOREIGN PATENT DOCUMENTS

| JP | 56-28361 | * | 3/1981 |
| JP | 4-20729 | * | 4/1992 |
| JP | 4-110536 | * | 4/1992 |

* cited by examiner

*Primary Examiner*—John Rivell
(74) *Attorney, Agent, or Firm*—Jacobson Holman PLLC

(57) ABSTRACT

The invention provides a flap valve for controlling the air pressure within a protected space defined by walls, the flap valve having a valve flap, articulated at least indirectly to the surface of one of the walls and being subjectable to both a sealing force which forces the valve flap against a valve seat surrounding an opening in the wall surface and to an opening force which lifts the flap off the valve seat. The flap valve has a first position in which the protected space is sealed off from a contaminated environment, and a second position in which air from the protected space is allowed to escape into the environment via the opening, wherein the sealing force is a magnetic attraction between a portion of the surface of the valve flap and the valve seat. A method for controlling the air pressure within a protected space is also provided.

7 Claims, 4 Drawing Sheets

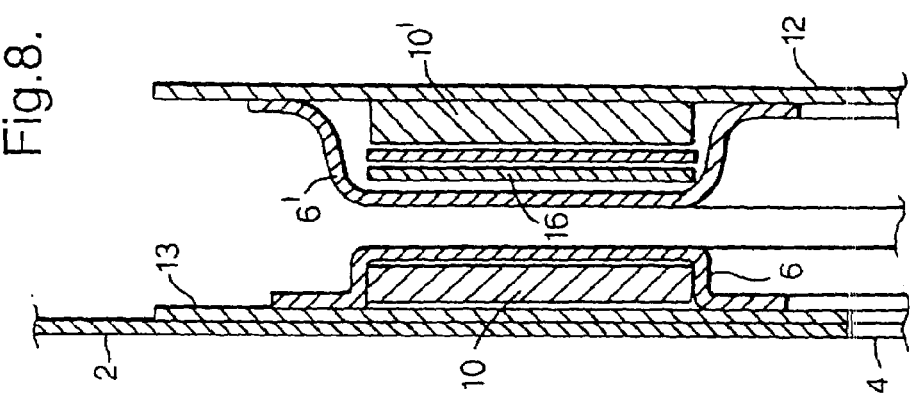
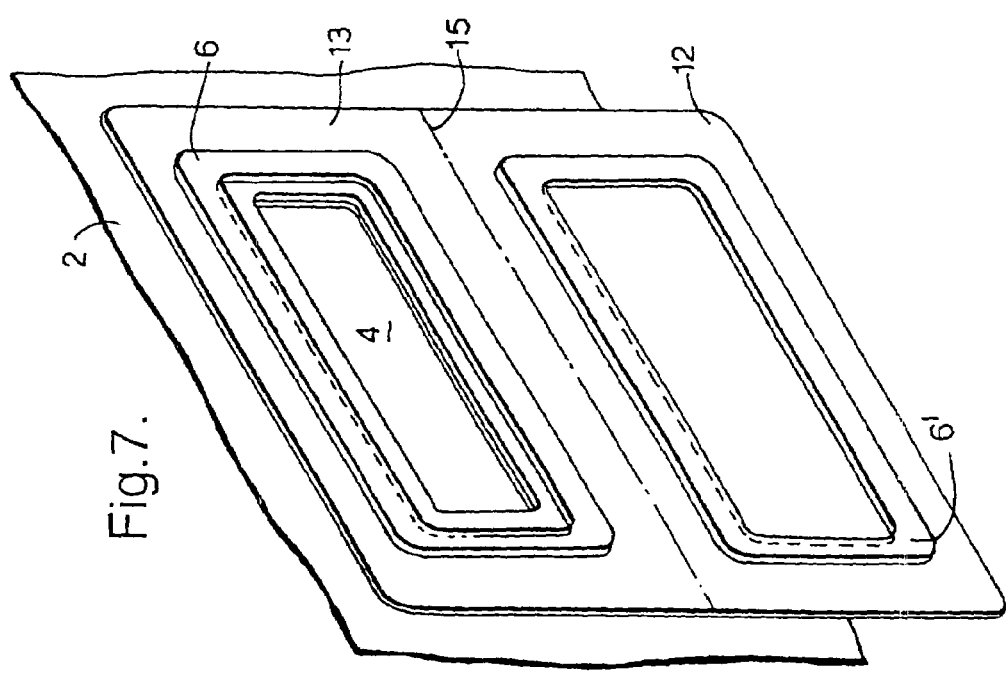

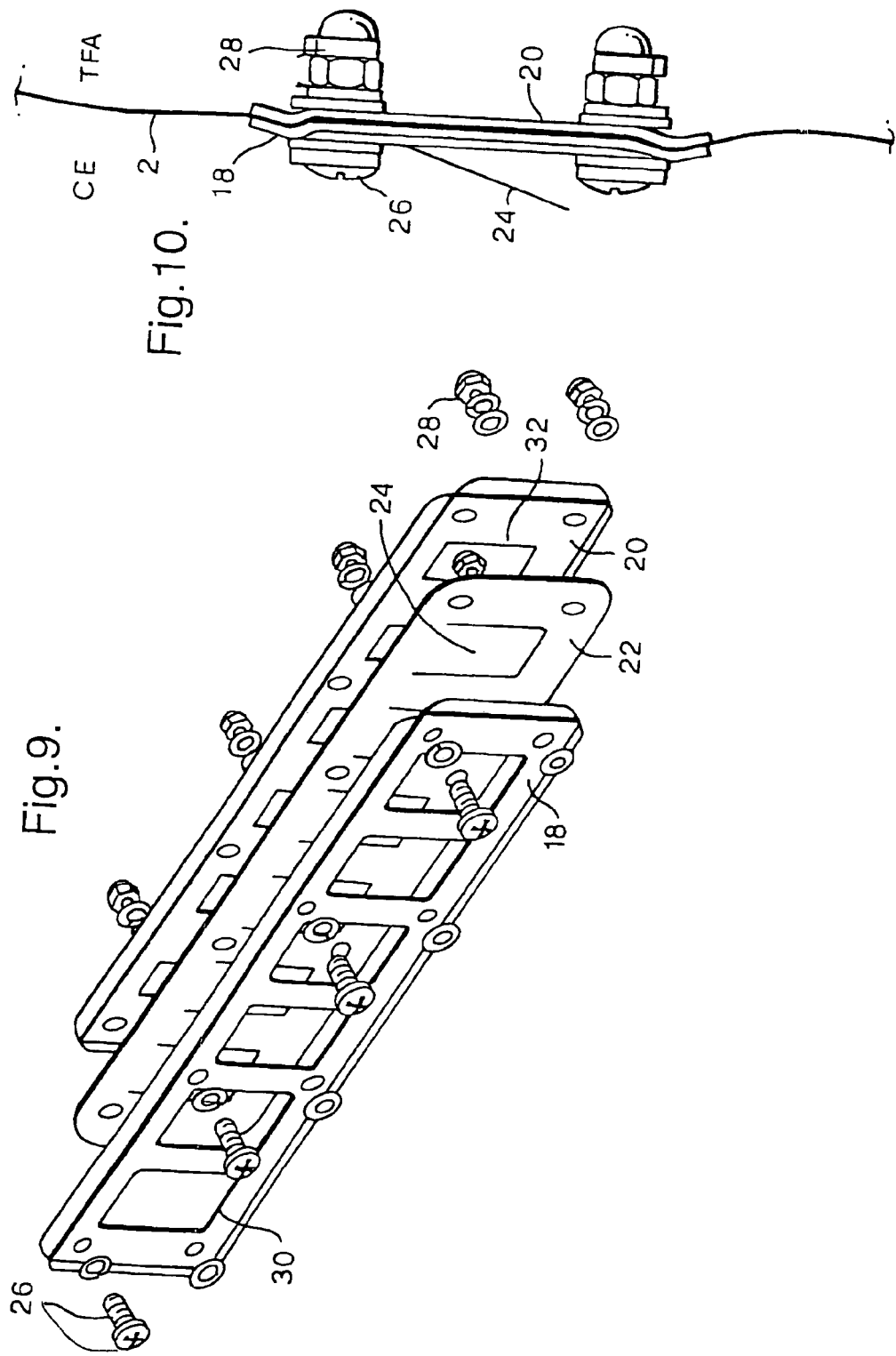

UNIDIRECTIONAL VALVES AND METHODS OF THEIR USE

FIELD OF THE INVENTION

The present invention relates to a valve for controlling the air pressure within a protected space defined by wall surfaces. More particularly, the invention relates to a flap valve to be used in a structure for preventing the penetration of contaminated air and/or gases, liquids or aerosols. The invention further relates to a method for controlling air pressure within such a protected space.

BACKGROUND OF THE INVENTION

As is known, there is an increasing need for protection against the penetration of contaminants into a sheltered space, given the threat of military attacks and acts of terror using nuclear, chemical or biological (NBC) means of warfare. Such protection is provided by the use of shelters and protected spaces located inside buildings ("hard" shelters), or tent structures ("soft" shelters). Hard shelters are provided with professional NBC air filtration systems including blowers, which create an overpressure inside the protected space and provide cleaned and filtered air. The overpressure is required in order to ensure a clear direction of airflow from inside the protected space to the outside atmosphere, through ever-present leaks in the walls of the shelter, the door and the window seals. Use of this method makes sure that no contaminated air will penetrate into the protected space.

To date, there are no known airtight soft shelter structures having an integrated, reliable air control valve. In a typical soft-type shelter, clean, NBC-filtered air is pushed by blowers into the tent, with excess air passing to the outside through leaks or specially created holes in the walls of the tent. The disadvantage of such an arrangement is that, during times when no fresh air is pumped into the protected space, e.g., during a blower breakdown, the essential overpressure immediately drops, with two dire results: contaminated air can enter the protected space via the air exit holes, and, if the protected space is in fact an inflated structure, the internal liner bubble may collapse, trapping inside all of the persons and goods to be protected. If these structures had closable valves, none of the above failures would be able to occur and the system would remain intact for a prolonged period of time until the clean air supply resumes and creates the required overpressure.

DISCLOSURE OF THE INVENTION

It is therefore a broad object of the present invention to provide both hard and soft protected shelter structures with valves for controlling air pressure that are reliable, inexpensive and easily installed.

It is a further object of the present invention to overcome the disadvantages of the fresh-air supplied prior-art protected spaces within soft shelter structures, and to provide such structures with valving arrangements that will either act as safety valves to protect the space against excessive overpressure, or to close off the protected space in the event of an air supply system failure until sufficient pressure has been rebuilt, or to operate as simple non-return valves.

According to the invention, the above objects are achieved by providing a flap valve for controlling the air pressure within a protected space defined by walls, the flap valve comprising a valve flap, articulated at least indirectly to the surface of one of the walls and being subjected to both a sealing force which forces the valve flap against a valve seat surrounding an opening in the wall surface and to an opening force which lifts the flap off the valve seat, the flap valve having a first position in which the protected space is sealed off from a contaminated environment, and a terminal position in which air from the protected space is allowed to escape into the environment via the opening; wherein the sealing force is a magnetic attraction between a portion of the surface of the valve flap and the valve seat.

The invention further provides a flap valve for controlling the air pressure within a protected space defined by walls, the flap valve comprising a valve membrane having a plurality of tongue-like valve flaps integral therewith; an outer clamping frame having a plurality of windows of a number equal to the number of flaps, of a size larger than the size of the flaps and of a spacing equal to the spacing of the flaps; an inner clamping frame having a plurality of windows of a number equal to the number of flaps, of a size smaller than the size of the flaps and of a spacing equal to the spacing of the flaps; the membrane and the surface of one of the walls being clamped together between the outer and inner clamping frames around a window cut in the wall.

The invention also provides a method for controlling the air pressure within a protected space defined by walls and having at least one window-like opening, the method comprising the steps of providing a flap valve; providing two trough-like frames; filling the frames with magnetic strips; attaching one of the frames to the surface of one of the walls, around the window-like opening; attaching the other one of the frames to the flap of the valve, and hingedly attaching the flap to the wall surface at one of its edges, at such a distance from the window-like opening that, when the flap is closed by swiveling it about its hinged edge, the frame attached to the wall surface and the frame attached to the flap will at least approximately register.

The invention still further provides a method for controlling the air pressure within a protected space defined by walls and having at least one window-like opening, the method comprising the steps of providing a flap valve; providing a plurality of sets of screws, washers and nuts, and using the sets of screws, washers and nuts to assemble the flap valve around the window-like opening in the following order: outer clamping frame, wall surface, membrane and inner clamping frame.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective view of a first embodiment of a flap valve according to the present invention, as seen from outside the protected structure;

FIG. 2 is a cross-sectional view, to a larger scale, of a portion of the wall surface of the protected space and the valve flap close to the shut-off position;

FIG. 3 is a cross-sectional view of the embodiment of FIG. 1, the solid lines showing the valve flap in the closed position and the dash-dotted line showing the flap in the open position;

FIG. 4 is a perspective view of a second embodiment of the valve according to the invention, seen from inside the protected structure;

FIG. 5 is a cross-sectional view, to a larger scale, of the embodiment of FIG. 4, showing a portion of the wall surface of the protected space and the valve flap close to the shut-off position;

FIG. 6 is a cross-sectional view of the embodiment of FIG. 4, the solid lines showing the valve flap in the open position and the dash-dotted line showing the flap in the closed position;

FIG. 7 illustrates a variant of the valve of FIG. 4;

FIG. 8 is a cross-sectional view, to a larger scale, of the embodiment of FIG. 7, showing a portion of the wall surface of the protected space and the valve flap close to the shut-off position;

FIG. 9 is an exploded view of a, non-return valve according to the invention, and FIG. 10. is a lateral view of the valve of FIG. 9 as assembled.

DETAILED DESCRIPTION OF PREFERRED EMBODIMENTS

Figure 3:
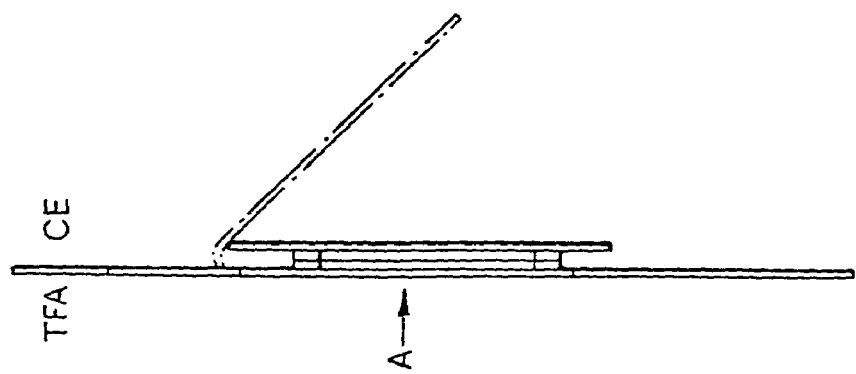
Figure 2:
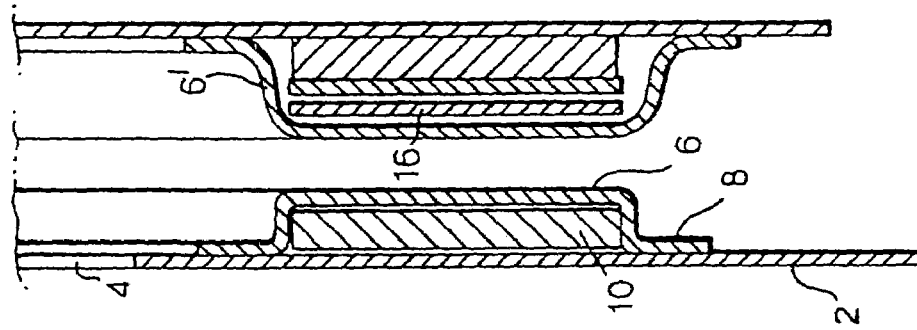
Figure 1:
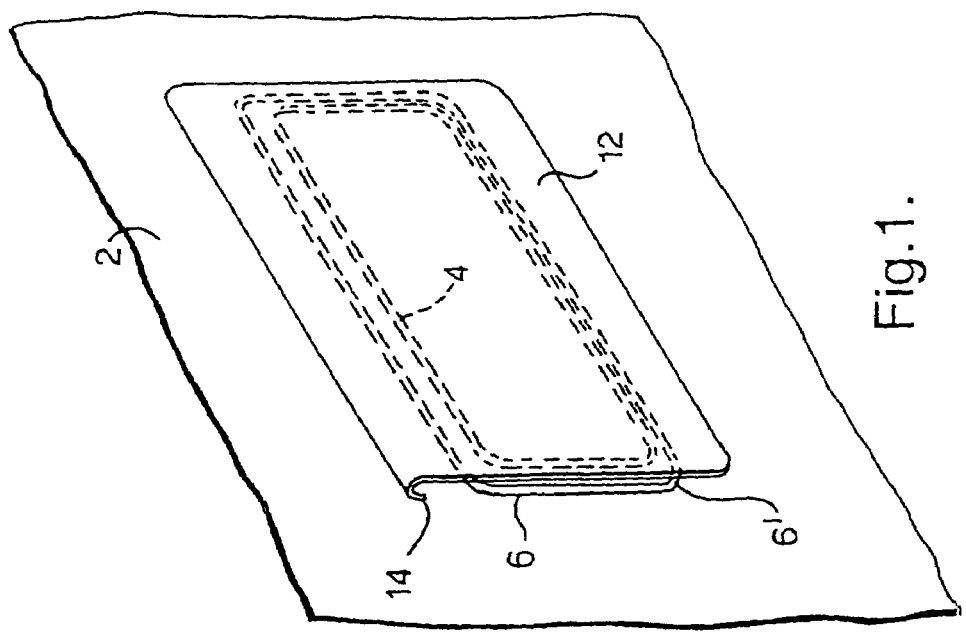

Referring now to the drawings, FIGS. 1–3 illustrate a portion of a wall 2 of an NBC-protected hard or soft structures (or shelters), which may be defined by rigid walls, semi-rigid walls, flexible walls, or a combination thereof, and is provided with a rectangular window 4. Advantageously, at least some of the walls are lightweight, flat, foldable, flexible walls, so as to form a tent structure easy to erect and transport. By opening the valve covering window 4, any excess pressure can exit from the structure through the window in the direction of arrow A, i.e., from the toxic-free area (TFA) to the contaminated environment (CE).

Window 4 is surrounded on its four sides by a trough-like frame 6 having flanges 8 whereby the frame is attached to the outside surface of wall 2. If wall 2 is made of a plastic material, attachment is advantageously effected by ultrasonic welding. However, other joining methods, e.g., such as gluing, are also possible. Prior to attaching frame 6 to wall 2, flexible strips 10 are introduced into the frame, filling both its horizontal and vertical sides. Strips 10 are made of plastic bands, consisting of a mixture of plastic and steel powder that can be magnetized after appropriate treatment, thereby turning into permanent magnets. While the use of flexible magnetic strips is a preferred solution, it is also possible to fill frame 6 with a plurality of small, separate, permanent magnets of the conventional type. In fact, frame 6 constitutes the valve seat for valve flap 12.

Valve flap 12, preferably made of a gas-tight, chemically impervious plastic laminate, is articulated to the outside surface of wall 2 by means of a joint 14, shown in FIG. 3 in both the closed and open (dash-dotted lines) positions. Flap 12 is provided with a frame 6', attached to the flap in such a way that when flap 12 is closed, frame 6 of wall 2 and frame 6' of flap 12 will register, at least approximately. Frame 6' is provided with magnetic strips 10'. It will be appreciated, however, that either strips 10 or strips 10' may be replaced by strips made of a ferromagnetic material, such as certain stainless steel alloys.

As shown in FIG. 2, frame 6' is slightly deeper than frame 6, providing space for the accommodation of one or more foil strips 16, made of a non-ferromagnetic material. The purpose of strips 16 is to adjust the magnetic attraction between flap 12 and wall 2 in the closed position of the flap, by providing a certain minimum distance between strips 10 and 10'. Other parameters that determine the opening point of the flap valve, that is, the pressure at which the valve is meant to open, are, apart from the weight of the flap, the surface area of window 4 and the allowable amount of overpressure in the protected structure.

The flap valve of FIGS. 1 to 3 is clearly a normally closed valve. In its closed position, the valve seals off the protected space against the contaminated environment.

Figure 6:
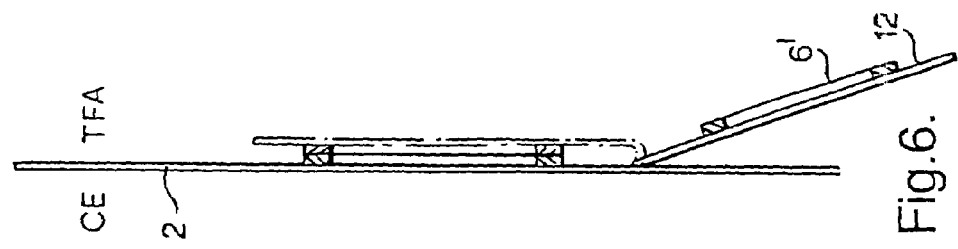
Figure 5:
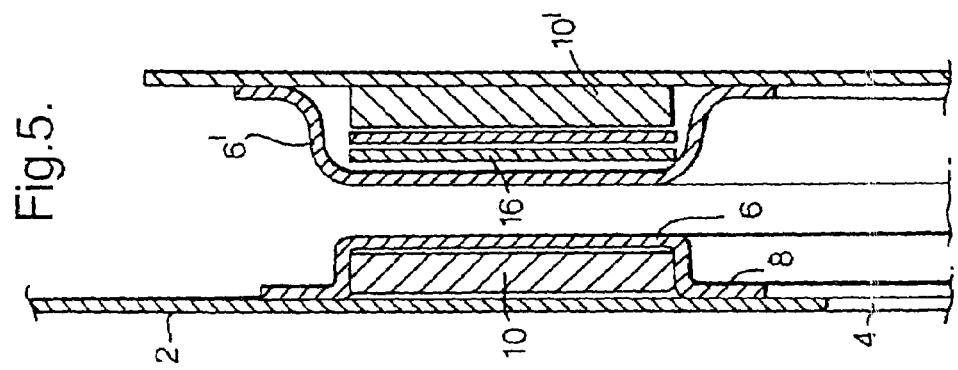
Figure 4:
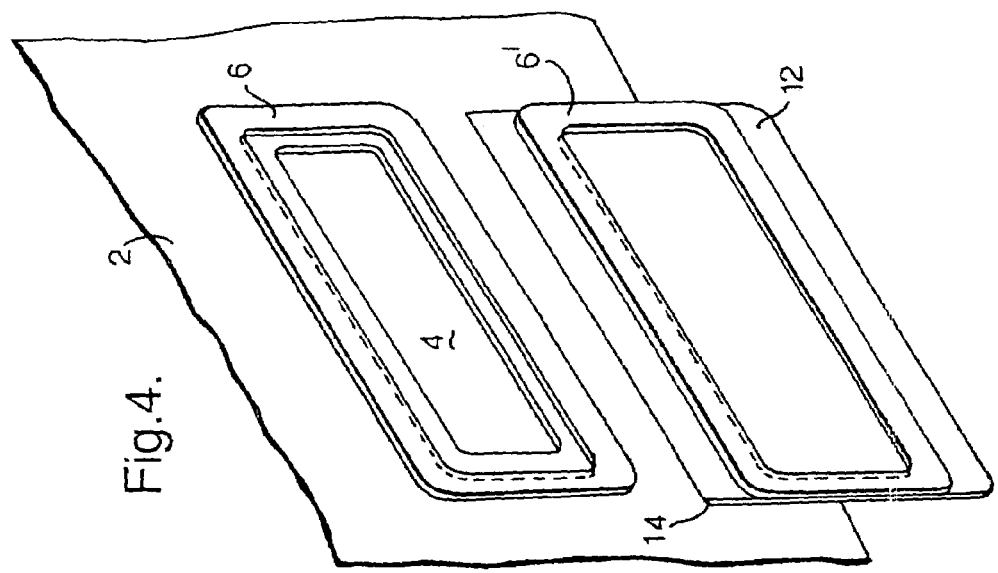

FIGS. 4 to 6 illustrate a second embodiment of the invention, in which the flap valve is normally open. The structure of this second embodiment is quite similar to that of the embodiment of FIGS. 1 to 3, except that the valve is articulated to the inside surface of wall 2. The special purpose of this flap valve has already been mentioned above: in case of blower failure, valve flap 12, which hangs open in its normal state as shown in FIG. 6, can be closed manually and will remain held in the closed position by magnetic attraction, regardless of the air pressure within the protected space. When the failure is corrected and overpressure restored, the valve can be manually reopened.

FIGS. 7 and 8 illustrate a variant of the embodiment of FIGS. 4–6. The difference resides in the fact that in this case, valve flap 12 is not directly articulated to the surface of wall 2 as shown in FIG. 4, but rather is an integral part of a base sheet 13 having a window at least as large as window 4. Base sheet 13 is firmly attached to the surface of wall 2, from its upper edge to the hinge 15, represented by the dash-dotted line. In this embodiment, flap 12 opens and closes by swiveling about hinge 15.

The non-return valve illustrated in FIGS. 9 and 10 is comprised of an outer clamping frame 18, an inner clamping frame 20, and a membrane to which are attached a plurality of integral tongue-like flaps 24. In the exploded view of FIG. 9, there are also shown clamping screws 26 and sets of washers and nuts 28. Outer and inner frames 18, 20 have windows 30, 32 respectively. The number of windows in each frame is equal to the number of flaps 24 in membrane 22, and the spacing of the windows in each frame is equal to the spacing of the flaps. It will also be seen that windows 30 are wider and longer than flaps 24, while windows 32 are narrower and shorter than the flaps. It is clear that windows 32 are designed to serve as valve seats for flaps 24.

The closing force acting upon the valve of FIGS. 9 and 10 is only the elastic resilience of flaps 24. The materials Teflon® or Mylar® have been selected to be used for membrane 22 and flaps 24, as these materials have been found to possess the required elastic resilience, as well as chemical imperviousness, at a thickness of 0.5 mm.

FIG. 10 is a lateral view of the valve of FIG. 9 in its assembled condition, showing outer clamping frame 18, inner clamping frame 20 and tongue-like valve flap 24 in its open position, protruding through outer frame 18 and wall 2. The edge regions of frames 18 and 20 are seen to have a shallow V-shaped profile, which enhances the clamping effect. Not shown is a window cut out of wall 2. The clamping order is: outer clamping frame 18, wall 2, membrane 22 and finally, inner frame 20.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A flap valve for controlling the air pressure within a protected space defined by walls, said flap valve comprising:
    a valve membrane having a plurality of tongue-like valve flaps integral therewith;
    an outer clamping frame having a plurality of windows of a number equal to the number of said flaps, of a size larger than the size of said flaps, and of a spacing equal to the spacing of said flaps;
    an inner clamping frame having a plurality of windows of a number equal to the number of said flaps, of a size smaller than the size of said flaps, and of a spacing equal to the spacing of said flaps;
    said membrane and the surface of one of said walls being clamped together between said outer and inner clamping frames around a window cut in said wall.

2. The flap valve as claimed in claim 1, wherein the edge regions of said outer and inner clamping frames are provided with a V-shaped profile, so as to enhance the clamping effect.

3. The flap valve as claimed in claim 1, wherein the thickness of said membrane is between 0.4 and 0.7 mm.

4. The flap valve as claimed in claim 1, wherein said membrane is made of a material selected from the group comprising Teflon® and Mylar®.

5. The flap valve as claimed in claim 1, wherein the walls of said protected space are rigid, semi-rigid, flexible or a combination thereof.

6. The flap valve as claimed in claim 1, wherein at least some of said walls are lightweight, flat, foldable, flexible walls.

7. A method for controlling the air pressure within a protected space defined by walls and having at least one window-like opening, said method comprising the steps of:
    providing a flap valve as claimed in claim 1;
    providing a plurality of sets of screws, washers and nuts, and
    using said sets of screws, washers and nuts to assemble said flap valve around said window-like opening in the following order: outer clamping frame, wall surface, membrane and inner clamping frame.

* * * * *